Patented Feb. 24, 1953

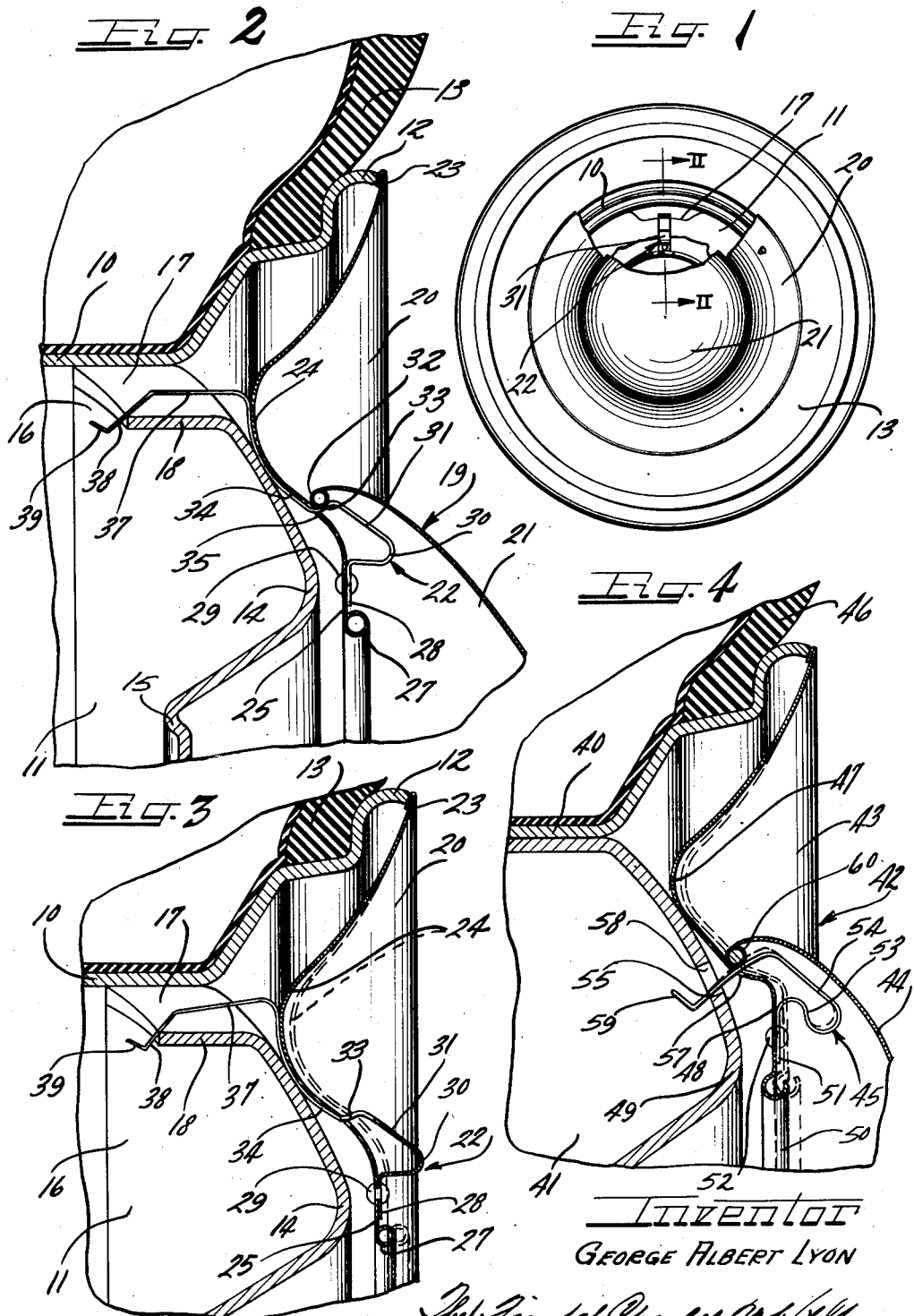

2,629,636

UNITED STATES PATENT OFFICE 2,629,636

WHEEL COVER

George Albert Lyon, Detroit, Mich.

Application July 29, 1947, Serial No. 764,354

12 Claims. (Cl. 301—37)

This invention relates to improvements in wheel structures and more particularly concerns the covering of the outer side of a vehicle wheel and a novel cover assembly therefor.

An important object of the present invention is to provide a wheel structure having an improved cover assembly applied to the outer side thereof.

Another object of the invention is to provide an improved cover assembly having novel means for attaching the cover to a wheel.

Still another object of the invention is to provide improved means for attaching a protective and ornamental cover to the outer side of a vehicle wheel.

A further object of the invention is to provide an improved wheel cover assembly wherein a plurality of cover components are adapted to be applied to the wheel in succession, and the last applied cover component acts to increase the retention of the cover on the wheel.

According to the general features of the invention there is provided a vehicle wheel structure including a tire rim portion and a wheel body portion, the wheel body portion affording openings through the wheel, and a cover assembly is applied to the outer side of the wheel, said cover assembly including an annular cover member for substantially concealing the tire rim and having a portion overlying the radially outer part of the wheel body, attachment clip structures carried by said annular cover member and extending therethrough and engaging in the wheel openings to retain the annular cover member on the wheel in response to an axially inward push upon the annular cover member, and an inner circular hub cap simulating cover member engaging the clip structures at the axially outer side of the annular cover member and retained in assembly by the clip structures and acting thereon to draw the same into substantially frictionally interlocked relation to the wheel body portion at said openings.

According to other features of the invention there is provided a cover assembly for the outer side of a vehicle wheel, including a circular cover member, and retaining clip means carried by the cover member and including a retaining portion for engagement by another cover member to retain the same in assembly with one side of the first mentioned cover member, and a portion extending from the clip means to the opposite side of the first cover member and arranged for retaining engagement with the wheel to which the cover is applied.

According to further features of the invention there is provided in a cover assembly a retaining clip structure including a portion arranged for attachment to a cover member and a resilient portion arranged to extend through the cover member and having a plurality of retaining shoulders, one of such shoulders being arranged for retaining engagement with a portion of a wheel to which the cover is applied, and another of said shoulders being arranged for retaining reception of another cover member to support the last mentioned cover member in assembly with the first mentioned cover member.

It is another feature of the invention to provide a cover assembly for disposition at the outer side of a vehicle wheel and comprising a trim ring annulus having retaining clip means mounted on the radially inner portion thereof and including a cover retaining portion at one face of the trim ring and a wheel engaging portion at the opposite face of the trim ring, and a hub cap cover member engaging the cover retaining portion of the spring clip means and arranged to place the wheel engaging portion of the spring clip means under substantially interlocking leverage with respect to the wheel.

According to other general features of the invention there is provided in a wheel structure including a wheel body and a tire rim, a cover annulus concealingly disposed over the outer side of the tire rim and an adjacent portion of the wheel body, an inner circular cover member, and retaining clips carried by the radially inner portion of the cover annulus and having respective portions retainingly engaging the wheel body and retainingly engaged by the inner cover member, the radially inner portion of the cover annulus being held out of engagement with the wheel body in the initially assembled relation by contact of the radially outer portion of the annulus with the tire rim, said inner cover member coacting with said clips to force and hold said inner portion of the annulus under tension toward the wheel body.

Other objects, features and advantages of the present invention will be readily apparent from the following detailed description of certain preferred embodiments thereof taken in conjunction with the accompanying drawings, in which:

Fig. 1 is a side elevational view of a vehicle wheel structure showing a cover according to the present invention applied thereto and with portions thereof broken away to reveal details of structure;

Fig. 2 is an enlarged radial sectional view through the wheel structure of Fig. 1 taken substantially on the line II—II;

Fig. 3 is a sectional view similar to Fig. 2 but showing the assembly prior to application of the hub cap cover member; and Fig. 4 is a radial sectional view similar to Fig. 2 but showing a modification.

As shown on the drawings:

Having reference to Figs. 1 to 3, inclusive, a vehicle wheel to which the present invention is adapted to be applied is composed of a tire rim 10 and a wheel body 11, the tire rim and wheel body being preferably formed from suitable sheet metal formed by rolling or stamping as is the practice or as preferred. The tire rim 10 is preferably of the multi-flanged type including a terminal flange 12 and adapted to receive a pneumatic tire and rim assembly 13.

The wheel body 11 is preferably formed with an annular, generally axially outwardly protruding nose portion 14 which encircles a generally dished bolt-on flange portion 15. The nose portion 14 slopes generally radially outwardly and axially inwardly to a marginal axially inwardly extending flange 17 which is attached in any suitable manner to the base flange of the tire rim 10. Between the tire rim 10 and the base flange 16 are preferably provided an annular series of spaced wheel openings 17 and these are preferably formed by inset portions 18 in the marginal attachment flange 16 of the wheel body.

Covering the outer side of the wheel ornamentally and protectively is a cover assembly 19. This cover assembly comprises a trim ring annulus member 20 and a hub cap central circular cover member 21, the cover members being retained in assembly with respect to one another and also with respect to the wheel by means of clip structures 22.

The trim ring cover member 20 is preferably of a radial magnitude and extent to substantially cover the outer side of the tire rim 10 and at least the juncture between the tire rim and the wheel body and preferably extends radially inwardly to overlie the annular nose portion 14 of the wheel body. In order to afford a pleasingly contoured outer surface and also to afford a visual impression of a relatively massive tire having a white side wall portion, the radially outer portion of the trim ring member 20 is preferably cross-sectionally contoured on a generally convex curvature and in general simulation of the side wall curvature of the tire 13. The radially outer edge of the trim ring member 20 is preferably turned upon itself to provide a reinforcing flange 23 which is adapted to lie adjacent to or, as shown, in concealing relation to the terminal flange 12 of the tire rim.

From the reinforced outer edge 23, the trim ring member 20 extends generally radially and axially inwardly toward the body member 11 and has an intermediate annular concave portion 24 which closely approaches the wheel body at a point radially inwardly from the wheel openings 17. The concave portion 24 defines a relatively wide annular groove from which the radially inner portion of the trim ring member extends generally radially inwardly and axially outwardly divergently relative to the adjacent radially outer side of the nose portion 14. The radially innermost portion of the trim ring is formed with a generally radially inwardly extending inner marginal flange 25 the radially inner edge of which is preferably turned to provide a reinforcing and finishing bead 27. By preference the inner marginal flange portion 25 is disposed in spaced relation axially outwardly from the adjacent nose bulge 14 of the wheel body.

The inner marginal flange portion 25 provides an annular platform for mounting of the retaining clip members 22. By preference there are the same number of the retaining clip members 22 as there are wheel openings 17. This may be three to five, as preferred.

According to the present invention the retaining clip members 22 are formed for not only retaining the cover members 20 and 21 assembled but also for retaining the composite cover on the wheel. To this end, each of the retaining clips 21 comprises a base flange portion 28 which is secured as by means of a rivet 29 to the marginal flange platform portion 25. From the base portion 28 extends an integral generally axially outwardly projecting gooseneck or loop portion 30 which is formed with a generally radially outwardly and axially inwardly extending cam flange portion 31 projecting to a radially outward extent slightly greater than an inturned edge reinforcing bead 32 on the hub cap cover member 21 and providing a cam surface against which the reinforcing bead 32 is pressed when the hub cap 21 is applied to the assembly.

Extending generally radially and axially inwardly from the radially outer end of the cam flange portion 31 of the spring clip is a hub cap retaining shoulder 33 which forms one end area of a shouldered flange portion integral with the cam flange portion. Thus, when the hub cap 21 is pressed home, it snaps behind the shoulder 33 and is retained in assembly with the trim ring member 20 of the cover.

In order to maintain the cover assembly on the wheel, the shouldered flange portion of the spring clip has inwardly beyond the shoulder 33 a wheel-engaging extension 34 which extends generally axially inwardly behind the trim ring cover member through an aperture 35 and then extends along the curve of the intermediate portion 24 of the trim ring member to a point radially outwardly beyond the adjacent wheel opening inset 18 in the wheel body. From this point the extension 34 has an integral axially inwardly extending flange part 37 which is formed with a retaining shoulder portion 38 that extends integrally from the flange part 37 generally radially and axially inwardly and is engageable with the adjacent edge of the wheel body flange inset 18 for retaining the cover assembly on the wheel. A cam flange terminal 39 is provided at the extremity of the shoulder flange portion 38. Thus, it will be observed that both the extension 34 and the flange part 37 together form the intermediate area of the shouldered flange portion of the clip and are angularly related to one another and to the shoulders 33 and 38 for attainment of the several operative relationships of the parts of the clip.

In applying the cover 19 to the wheel, the trim ring member 20 is preferably applied first and before the hub cap member 21 is applied to the assembly. Thus, the trim ring member 20 is carried to the wheel and with the attachment shoulder portions 38 of the spring clips generally aligned with the respective wheel openings 17, the trim ring cover member 20 is pushed axially inwardly until the retaining clip shoulders 38 snap into engagement with the axially inner edges of the wheel opening inset portions 18 of the wheel body flange. If the cover member 20 is pushed hard up against the wheel body 11, the assembly will then be as seen in full outline in Fig. 3, since the slight cover tensioning differential afforded by having the outer edge 23 engage the rim flange 12 in advance will be taken up. If the trim member 20 is not pushed all the way home, the radially inner portion thereof will be slightly clear of the wheel body, as indicated in broken outline in Fig. 3.

Thereafter, the hub cap cover member 21 may be applied to the assembly by pressing it home until the beaded edge 32 snaps behind the retaining shoulder 33 of the retaining clip members.

By preference, the retaining clip members 22 are tensioned in such a manner that before the hub cap member 21 is applied the hub cap retaining shoulder 33 and the wheel engaging extension 34 are sprung generally radially outwardly to a limited extent as permitted by the radial dimension of the clip-clearing aperture 33. This relationship is shown in Fig. 3 and, as will be perceived, the retaining shoulder portion 38 of the clip in this condition is relieved from excessive gripping pressure or tension against the engaged portion of the wheel body, thereby facilitating application of the trim ring member 20 to the wheel. When the hub cap 21 is then applied, the hub cap retaining shoulder 33 is drawn radially inwardly and at the same time the wheel body engaging extension 34 of the clip is also drawn radially inwardly, and thereby the axially inward leg extension 37 is levered radially inwardly from its axially outer end, and the retaining shoulder 38 is drawn into substantially locking or latching engagement with the engaged portion of the wheel body. At least, the tension of the shoulder portion 38 is substantially increased so that the cover is held positively in place on the wheel.

Since substantial pressure must be exerted against the hub cap member 21 to assemble it, the radially inner portion of the trim ring member 20, if spaced from the wheel body, will be flexed inwardly against the wheel body and retained there by the tensioned clips 22 in cooperation with the hub cap member 21.

To remove the cover 19 from the wheel, the hub cap portion 21 is first removed by applying a pry-off tool to the beaded edge 32 thereof and prying it free from the retaining clip members 22. Thereafter a pry-off tool is applied in the space between the platform marginal portion 25 of the trim ring member 20 and the nose bulge 14 and the trim ring cover member 20 thereby freed from the wheel. However, for most purposes it will be unnecessary to remove the trim ring cover member 20, because ample access can be had to the bolt-on flange portion 15 of the wheel merely by removing the hub cap member 21. It will be clear that the central opening defined by the finished, beaded edge 27 of the trim ring cover member amply clears the bolt-on flange recess.

In the modification of Figure 4, provision is made for attaching the cover to the wheel where the wheel may not be provided with wheel openings at the juncture of the tire rim and the wheel body or where it may be for one reason or another inconvenient to have the spring clips engaged in the wheel openings. To this end, a wheel having a tire rim 40 and a wheel body 41 has assembled on the outer side thereof a cover 42 comprising a trim ring member 43 and a hub cap member 44, the cover assembly being maintained in assembly with respect to the components thereof and in place on the wheel by means of spring clip members 45.

The trim ring member 43 is of generally similar construction as the trim ring member 20 and may also be formed with a radially outer portion convexly curved in general simulation of the side wall curvature of a tire 46 carried by the tire rim. The radially outer portion of the trim ring member 43 lies in substantially concealing relation to the outer side of the tire rim 40 and merges with an intermediate annular portion 47 of concave cross section from which extends generally radially inwardly and axially outwardly a radially inner portion formed with a radially inner marginal platform flange 48 serving as a support for the clips 45 and in assembly being in spaced relation to an annular axially outwardly extending reinforcing nose bulge 49 on the wheel body 41. A reinforcing and finishing bead 50 is formed at the radially inner extremity of the platform flange 48.

Each of the clips 45, of which there may be any preferred number in an annular series, comprises a base flange 51 which is secured as by means of a rivet 52 to the platform flange 48 and has an integral and generally S-shaped body or gooseneck portion 53 which extends generally axially outwardly and merges with a generally radially outwardly and axially inwardly extending oblique cam flange portion 54 having a retaining shoulder lever flange portion 55 which extends generally radially and axially inwardly through a clearance aperture 57 in the radially inner oblique portion of the trim ring member 43. The length of the retaining flange portion 55 is such as to extend substantially axially inwardly beyond the trim ring member and in retaining relation into and through a clip receiving aperture 58 in the radially outer side of the nose portion 49 of the wheel body. A cam terminal 59 on the shoulder flange 55 facilitates entry of the shoulder flange through the aperture 58.

The length and disposition of the shoulder flange 55 is such that at the radially outer side of the axially outer end area thereof adjacent the cam flange portion 54, a shoulder is provided for retaining engagement with an edge bead 60 on the hub cap 44, while at the radially inner side of the axially inner end area of the flange portion 55 a retaining shoulder is provided which engages the wheel body at the radially inner edge defining the clip aperture 58.

Similarly as in the case of the cover 19, the trim ring member 43 is preferably first applied to the wheel by aligning the cam terminal 59 of the several clips 45 with the respective apertures 58 and then pushing axially inwardly on the trim ring member 43 until the clips snap into engagement behind the retaining shoulders afforded by the radially inner sides of the clip apertures 58. In this condition, the normal tension of the clips 45 is such that they will assume the relationship as indicated in broken outline in Fig. 4 wherein the shoulder flange 55 is forced radially outwardly against the radially outer edge defining the clearance aperture 57 serving as a limit stop therefor. In this condition of the trim ring member 43, its radially inner portion is preferably spaced axially outwardly from the wheel body by having the radially outer margin make initial contact with the terminal flange of the tire rim (see broken outline position in Fig. 4).

Upon application of the hub cap 44 by pressing it axially inwardly against the cam surface 54 until it snaps behind the retaining shoulder afforded therefor by the shoulder flange 55, the shoulder flange is forced radially inwardly as shown in full outline and this affords a tensioning, latching, frictional interlocking leverage action of the shoulder flange 55 in engagement with the wheel body whereby the cover is positively held on the wheel. At the same time the application of pressure against the hub cap forces the radially inner portion of the trim ring member to flex inwardly against the wheel body to the full line position indicated.

To remove the cover 14, a pry-off tool is first applied to the beaded edge of the hub cap member 44 and the hub cap is pried free from the clips 45. Thereafter a pry-off tool applied behind the inner marginal flange 48 of the trim ring member 43 in the space between the flange and the reinforcing nose portion 49 will be effective to pry the trim ring member 43 free from the wheel, where that is desired.

It will thus be apparent that in both forms of the invention disclosed the clip members have retaining shoulders for not only attaching the cover assembly to the wheel but also for retaining the components of the cover assembly in the assembled relationship. As an incident to the final assembly by attachment of the hub cap to the trim ring, the shoulder portions of the clips are subjected to a tensioning lever action which reacts not only to effect a substantially positive latching engagement thereof with the wheel but also to retain the hub cap more securely in the assembly.

I claim as my invention:

1. In a vehicle wheel structure including a tire rim portion and a wheel body portion, the wheel body portion affording openings through the wheel, a cover assembly applied to the outer side of the wheel, said cover assembly including an annular cover member for substantially concealing the tire rim and having a portion overlying the radially outer part of the wheel body, attachment clip structures carried by said annular cover member and extending therethrough and engaging in the wheel openings to retain the annular cover member on the wheel in response to an axially inward push upon the annular cover member, and an inner circular hub cap simulating cover member engaging the clip structures at the axially outer side of the annular cover member and retained in assembly by the clip structures and acting thereon to draw the same into substantially frictionally interlocked relation to the wheel body portion at said openings.

2. In combination in a wheel structure including a tire rim and a wheel body, the wheel body having a radially outer peripheral attachment flange inset to provide wheel openings, a cover assembly, including a trim ring member for substantially concealing the tire rim and the wheel openings and having a radially inner portion overlying the wheel body, a hub cap member, and retaining spring members carried by said overlying radially inner portion of the trim ring member and formed with retaining shoulders engageable by the hub cap and with retaining shoulders engageable within the wheel openings, said shoulders being interconnected and placed under latching tension by the engagement of the hub cap with the hub cap retaining shoulders.

3. In combination in a wheel structure including a tire rim and a wheel body, the wheel body having a radially outer peripheral attachment flange inset to provide wheel openings, a cover assembly, including a trim ring member for substantially concealing the tire rim and the wheel openings and having a radially inner portion overlying the wheel body, a hub cap member, and retaining spring members carried by said overlying radially inner portion of the trim ring member and formed with retaining shoulders engageable by the hub cap and with retaining shoulders engageable within the wheel openings, said shoulders being interconnected and placed under latching tension by the engagement of the hub cap with the hub cap retaining shoulders, said trim ring cover member including a limit stop engageable by each of the spring clip members in the unassembled condition of the cover to retain the spring clips within working limits.

4. In combination in a wheel cover for disposition on the outer side of a vehicle wheel, a trim ring member having a radially inner portion thereof adapted to be disposed opposite the wheel body of the wheel, a hub cap member adapted to be disposed in concealing relation to said radially inner portion of the trim ring member, and retaining spring clips mounted on the axially outer side of said radially inner portion of the trim ring member in position to be concealed by the hub cap and having hub cap retaining shoulders engaged by the hub cap, the trim ring member having clip clearing openings, said spring clips having their outer end portions secured to the trim ring member and extending through said clip clearing openings and having retaining shoulders on the extending portions thereof disposed for retaining engagement with the wheel body.

5. In a wheel cover of the character described, a trim ring member having a radially inner marginal portion, and retaining clips mounted on one side of the inner marginal portion and having retaining shoulder flanges extending through apertures in the trim ring member, said apertures providing limit stops and said shoulder flanges being normally tensioned against said limit stops.

6. In a wheel structure, including a tire rim and a load-sustaining body portion, a cover assembly for the outer side of the wheel including a trim ring portion for substantially concealing the tire rim and the juncture of the tire rim and the wheel body and having a radially inner portion arranged to lie in assembly in spaced relation to the adjacent portion of the wheel body, said radially inner portion of the trim ring member having retaining clips mounted on the axially outer side thereof and with the outer end portions of the clips fixedly secured to the trim ring member, a hub cap member secured in place by said clips, said clips having portions extending therefrom through the trim ring and engaging the wheel body retainingly, said hub cap being removable by application of pry-off force to the edge thereof, and said trim ring being removable from the wheel body by application of pry-off force thereto in the space between said radially inner portion of the trim ring member and the adjacent portion of the wheel body.

7. In a cover assembly of the character described, an annular cover member having retaining clips secured to the outer side thereof and the clips having elongated retaining shouldered portions providing radially outwardly directed shoulders at the outer side of the first mentioned cover member for attachment of another cover member to the first mentioned cover member and radially inwardly directed retaining shoulders at the inner side of the first mentioned cover member for attachment of the cover assembly to a wheel, said annular cover member having apertures therethrough spaced substantially radially outwardly from the inner edge of said annular cover member for passage of intermediate sections of said shouldered portions.

8. A retaining clip structure including an attachment base flange, a generally gooseneck portion extending from said attachment base flange and formed with a cam flange portion, said cam flange portion terminating in a shouldered flange portion, said shouldered flange portion being of substantial length and having retaining shoulders at respectively the end area thereof adjacent the cam flange and adjacent the terminal part thereof.

9. A retaining clip structure including an attachment base flange, a generally gooseneck portion extending from said attachment base flange and formed with a cam flange portion, said cam flange portion terminating in a shouldered flange portion, said shouldered flange portion being of substantial length and having retaining shoulders at respectively the end area thereof adjacent the cam flange and adjacent the terminal part thereof, said retaining shoulder portion having an intermediate area extending generally angularly to the retaining shoulders.

10. In combination in a wheel structure including tire rim and body parts, a trim ring member having a radially outer portion in concealing relation to the tire rim part and a radially inner portion joined to the radially outer portion by a convex annular groove portion which approaches close to or engages the wheel body, said radially inner portion being disposed in spaced relation to the wheel body and affording pry-off tool clearance, a hub cap member, and spring clips carried by said radially inner portion of the trim ring member and having a portion providing retaining shoulder means for retaining engagement by the hub cap and retaining shoulder means engaging with the wheel body to retain the cover assembly on the wheel.

11. In a wheel structure including a tire rim and a wheel body, a cover annulus concealingly disposed over the outer side of the tire rim and an adjacent portion of the wheel body, an inner circular cover member, and retaining clips carried by the radially inner portion of the cover annulus and having respective portions retainingly engaging the wheel body and retainingly engaged by the inner cover member, the radially inner portion of the cover annulus being held out of engagement with the wheel body in the initial assembled relation by contact of the radially outer portion of the annulus with the tire rim, said inner cover member coacting with said clips to force and hold said inner portion of the annulus under tension toward the wheel body.

12. A cover structure for disposition at the outer side of a vehicle wheel comprising, in combination, a circular cover member having mounted on the outer side thereof a plurality of retaining spring clips, apertures in the cover member adjacent to the spring clips, and retaining portions on the spring clips extending rearwardly through the apertures in the cover and adapted for engagement with the wheel for retaining the cover on the wheel.

GEORGE ALBERT LYON.

REFERENCES CITED

The following references are of record in the file of this patent:

UNITED STATES PATENTS

| Number | Name | Date |
|---|---|---|
| 2,202,102 | Horn | May 28, 1940 |
| 2,317,393 | Lyon | Apr. 27, 1943 |
| 2,386,244 | Lyon | Oct. 9, 1945 |